(12) United States Patent
Tazawa et al.

(10) Patent No.: US 8,401,034 B2
(45) Date of Patent: Mar. 19, 2013

(54) TRANSPORT APPARATUS AND TRANSPORT METHOD

(75) Inventors: Hideaki Tazawa, Kawasaki (JP); Hideaki Arao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 450 days.

(21) Appl. No.: 12/683,955

(22) Filed: Jan. 7, 2010

(65) Prior Publication Data

US 2010/0178060 A1    Jul. 15, 2010

(30) Foreign Application Priority Data

Jan. 14, 2009   (JP) ................................. 2009-006073

(51) Int. Cl.
*H04L 12/43*    (2006.01)
(52) U.S. Cl. ...................................... 370/460
(58) Field of Classification Search .................. 370/460, 370/431, 437
See application file for complete search history.

(56) References Cited

U.S. PATENT DOCUMENTS

| | | | |
|---|---|---|---|
| 5,493,609 A * | 2/1996 | Winseck et al. ............ | 379/93.08 |
| 6,973,090 B2 * | 12/2005 | Ofek et al. ..................... | 370/400 |
| 7,646,789 B2 * | 1/2010 | Umayabashi et al. ........ | 370/467 |
| 2007/0076769 A1 * | 4/2007 | Zou ................................ | 370/539 |
| 2010/0054731 A1 * | 3/2010 | Oltman et al. ..................... | 398/1 |

FOREIGN PATENT DOCUMENTS

JP    2004-266480    9/2004

* cited by examiner

*Primary Examiner* — Mark Rinehart
*Assistant Examiner* — Mohammad Anwar
(74) *Attorney, Agent, or Firm* — Fujitsu Patent Center

(57) ABSTRACT

A transport apparatus, includes a switching frame generator that generates a GCC-mode-switching special frame for instructing a corresponding apparatus to switch a GCC mode, a GCC overhead insertion unit that inserts the GCC-mode-switching special frame generated by the switching frame generator into a GCC overhead and transmits the GCC overhead to the corresponding apparatus, a transmission-mode controller that performs a control operation to switch the GCC mode of its own apparatus after the transmission of the GCC-mode-switching special frame is completed by the GCC overhead insertion unit, a switching-frame determination unit that determines, upon receiving the GCC overhead from the corresponding apparatus, whether the GCC-mode-switching special frame is inserted into the GCC overhead, and a reception-mode controller that performs a control operation to switch the GCC mode of its own apparatus when the switching-frame determination unit determines that the GCC-mode-switching special frame is inserted into the GCC overhead.

6 Claims, 12 Drawing Sheets

FIG.7

| FLAG SEQUENCE 01111110 (1 BYTE) | MODE-SWITCHING INFORMATION (1 BYTE) | CRC (1 BYTE) | FLAG SEQUENCE 01111110 (1 BYTE) |
|---|---|---|---|

| BIT 1 1 (FIXED) | BIT 2 | BIT 3 | BIT 4 | BIT 5 | BIT 6 | BIT 7 | BIT 8 1 (FIXED) |
|---|---|---|---|---|---|---|---|
| | FRAME TYPE | | GCC-MODE INFORMATION | | | | |

| FRAME TYPE (2 BITS) | GCC-MODE INFORMATION |
|---|---|
| 00 | COMMAND-ONE |
| 01 | RESPONSE-ONE |
| 10 | COMMAND-TWO |
| 11 | RESPONSE-TWO |

| GCC-MODE INFORMATION (6 BITS) | GCC-MODE INFORMATION |
|---|---|
| 0001 | GCC1/GCC MODE |
| 0010 | GCC1+GCC2 MODE |

TRANSPORT APPARATUS AND TRANSPORT METHOD

CROSS-REFERENCE TO RELATED APPLICATION(S)

This application is based upon and claims the benefit of priority from Japanese Patent Application No. 2009-006073, filed on Jan. 14, 2009, the entire contents of which are incorporated herein by reference.

FIELD

The embodiments discussed herein are directed to a transport apparatus, a transport method, and a transport program for data transmission using a GCC overhead such as transmission of control information among apparatuses.

BACKGROUND

Conventionally, OTN (Optical Transport Network) has been widely used in large-capacity long-distance optical transport networks. OTN is a technology standardized by the ITU-T. Using a network-monitoring OH (Overhead), OTN facilitates network management and identification of network failure.

Such a network-monitoring OTN-OH includes an OH defined as GCC (Generic Communications Channel) (see FIG. 10). A GCC-OH is used for data transmission such as transmission of control information among OTN apparatuses. Further, the GCC-OH is classified into three types as follows: GCC0 (General Communication Channel 0), GCC1 (General Communication Channel 1), and GCC2 (General Communication Channel 2). Each type of GCC-OH is two bytes.

The GCC0-OH is defined in OTU (Optical Transmission Unit)-OH and used for data transmission between apparatuses at the ends of OTU layer. The GCC1-OH and GCC2-OH are defined in the ODU (Optical Data Unit)-OH and used for data transmission between apparatuses at the ends of ODU layer.

There are two standardized modes for bytes of GCC1 and GCC2: a communication mode with independent 2 Byte×2 Channels (hereinafter, "GCC1/GCC2 mode"), and a communication mode with 4 bytes×1 Channel in which GCC1 and GCC2 are integrated as one channel (hereinafter, "GCC1+GCC2 mode").

With the GCC1/GCC2 mode, two channels of approximately 1.3 Mbps transmission band are available. With the GCC1+GCC2 mode, one channel of approximately 2.6 Mbps transmission band is available. Communication carriers use the GCC1/GCC2 mode or the GCC1+GCC2 mode depending on the required capacity of band.

Monitoring control on the OTN network is performed with a node on the network designated as GNE (Gateway Network Element) (e.g., a node 1 in FIG. 11), so that a simple management can be provided. Monitoring control on nodes away from the GNE is performed using a GCC.

The OTN network is available usually in the GCC1/GCC2 mode because the load on apparatuses can be suppressed on this mode. However, when a large-capacity file transport has to be performed for upgrading software used by the apparatuses or for other purposes, a wider transmission band is required temporarily. In such a case, the mode is switched to the GCC1+GCC2 mode, and the band thus becomes wider temporarily.

A process for switching the GCC1/GCC2 mode to the GCC1+GCC2 mode or vice versa is described with reference to an example in FIG. 11. For example, in order to switch the GCC mode between a node 2 and a node 5 in FIG. 11, a monitoring control apparatus sends mode-switching commands to both nodes via the GNE using the GCC. Because the mode-switching commands cannot be sent to the two nodes at the exact same instance, the GCC mode of one of the nodes is necessarily switched first.

A configuration and a process for switching the GCC band are described in detail with reference to FIG. 12. As depicted in FIG. 12, a receiving side includes a GCC1-OH extractor, a GCC2-OH extractor, an HDLC (High-Level Data Link Control)-frame constructor, and an HDLC-frame receiver. The GCC1-OH extractor and the GCC2-OH extractor extract a GCC1-OH and a GCC2-OH of 16 bits from an OH part of an input OTN signal, respectively. The 16-bit GCC1-OH parallel data and 16-bit GCC2-OH parallel data are input into the HDLC-frame constructor.

The HDLC-frame constructor converts the 16-bit GCC-OH parallel data into an HDLC frame. Depending on the mode set by the software, the HDLC-frame constructor converts the 16-bit GCC-OH parallel data into an HDLC frame: either an HDLC-frame of 1.3 Mbps×2 Channels on the GCC1/GCC2 mode, or an HDLC frame of 2.6 Mbps×1 Channel on the GCC1+GCC2 mode.

The converted HDLC frame is input to the HDLC-frame receiver. The HDLC-frame receiver performs a termination process on the HDLC frame. Depending on the mode set by the software, the HDLC-frame receiver performs the termination process: the termination process for 1.3 Mbps×2 Channels on the GCC1/GCC2 mode, or a termination process for 2.6 Mbps×1 Channel in the GCC1+GCC2 mode. Reception information encapsulated in the HDLC frame is processed by a CPU using a software.

A transmitting side includes an HDLC-frame generator, a GCC-OH converter, a GCC1-OH insertion unit, and a GCC2-OH insertion unit. The HDLC-frame generator generates HDLC serial data by encapsulating transmission information generated by a software in an HDLC frame.

Depending on the mode set by the software, the HDLC-frame generator generates the HDLC serial data: HDLC serial data of 1.3 Mbps×2 Channels in the GCC1/GCC2 mode, or HDLC serial data of 2.6 Mbps×1 Channel in the GCC1+GCC2 mode. The generated HDLC serial data is input to the GCC-OH converter.

In order to map the HDLC serial data on the GCC1-OH or the GCC2-OH, the GCC-OH converter converts the HDLC serial data into parallel data. The conversion depends on the mode set by the software. On the GCC1/GCC2 mode, the GCC-OH converter converts the serial data of 1.3 Mbps×2 Channels into each 16-bit parallel data.

In the GCC1+GCC2 mode, the GCC-OH converter converts the serial data of 2.6 Mbps×1 Channel into 16-bit×2 parallel data (32 bits in total). The converted 16-bit parallel data is input to the GCC1-OH insertion unit and the GCC2-OH insertion unit. The GCC1-OH insertion unit and the GCC2-OH insertion unit map the input parallel data on the GCC1-OH and the GCC2-OH of the OTN signal (see, for example, Japanese Laid-open Patent Publication No. 2004-266480).

When a monitoring control apparatus performs the process for switching the GCC mode of an apparatus located far away using a technology for a band switching process between the GCC1/GCC2 mode and the GCC1+GCC2 mode described above, transmission is always lost because of inconsistency of the mode between the corresponding apparatuses. Therefore, the process for switching the GCC mode under a monitoring network based on a unified control cannot be efficient.

For example, consider an example depicted in FIG. 11. At the exact moment when the mode of the node 2 is switched from the GCC1/GCC2 mode to the GCC1+GCC2 mode, the mode of the node 2 inevitably becomes inconsistent with the mode of the node 5. As a result, transmission is lost between the monitoring control apparatus and the node 5.

Furthermore, in order to switch the mode of the node 5 to the GCC1+GCC2 mode, GCC transmission between the node 2 and the node 5 needs to be established. However, because the node 5 cannot be accessed from the monitoring control apparatus, there is a possibility that the mode cannot be changed. In order to re-establish transmission to the node 5, the mode of the node 2 needs to be switched back to the GCC1/GCC2 mode. As a result, the mode change for the GCC1+GCC2 mode fails.

Specifically, as depicted in a process configuration in FIG. 12, the GCC modes of the HDLC-frame constructor, the HDLC-frame receiver, the HDLC-frame generator, and the GCC-OH converter are switched so as to switch the GCC band according to instructions from the software. The GCC mode needs to be switched for each individual node.

As described, in order to switch the GCC mode between the corresponding apparatuses that are located far away by the monitoring control apparatus, switching the GCC mode of one of the apparatuses inevitably causes the mode to be inconsistent, and the GCC mode cannot be switched. To perform the GCC mode switching with a conventional configuration, a network operator needs to set a setting of each apparatus locally, each apparatus needs to be connected with the monitoring control apparatus on LAN, or the network needs to be duplicated so as to constitute a redundant GCC configuration. The management of such a network is complex, and equipment investment is increased, which results in higher costs.

SUMMARY

According to an aspect of an embodiment of the invention, a transport apparatus includes: a switching frame generator that generates a GCC-mode-switching special frame for instructing a corresponding apparatus to switch a GCC mode; a GCC overhead insertion unit that inserts the GCC-mode-switching special frame generated by the switching frame generator into a GCC overhead and transmits the GCC overhead to the corresponding apparatus; a transmission-mode controller that performs a control operation to switch the GCC mode of its own apparatus after the transmission of the GCC-mode-switching special frame is completed by the GCC overhead insertion unit; a switching-frame determination unit that determines, upon receiving the GCC overhead from the corresponding apparatus, whether the GCC-mode-switching special frame is inserted into the GCC overhead; and a reception-mode controller that performs a control operation to switch the GCC mode of its own apparatus when the switching-frame determination unit determines that the GCC-mode-switching special frame is inserted into the GCC overhead.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 7 is a diagram illustrating an extended-GCC-mode-switching special frame format;

DESCRIPTION OF PREFERRED EMBODIMENT(S)

Preferred embodiments of the present invention will be explained with reference to accompanying drawings.

[a] First Embodiment

In the embodiments below, a configuration and a procedure of an optical transport apparatus in accordance with a first embodiment are described first and an effect of the first embodiment is described later. In the description below, the present invention is applied to an optical transport apparatus located on an OTN network.

Configuration of OTN Network System

Figure 1:
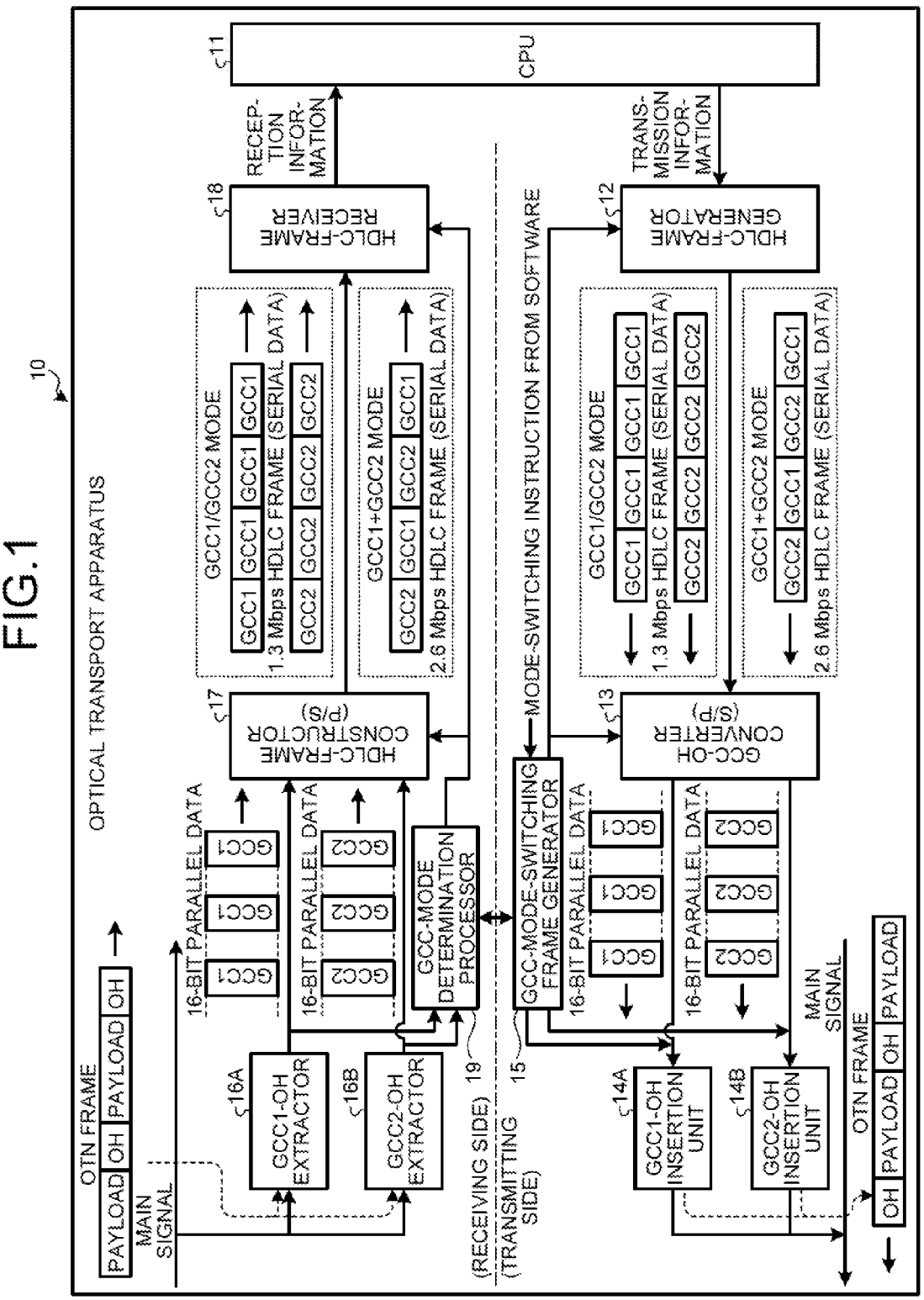
FIG. 1 is a block diagram of an overall configuration of an optical transport apparatus in accordance with a first embodiment.
Figure 2:
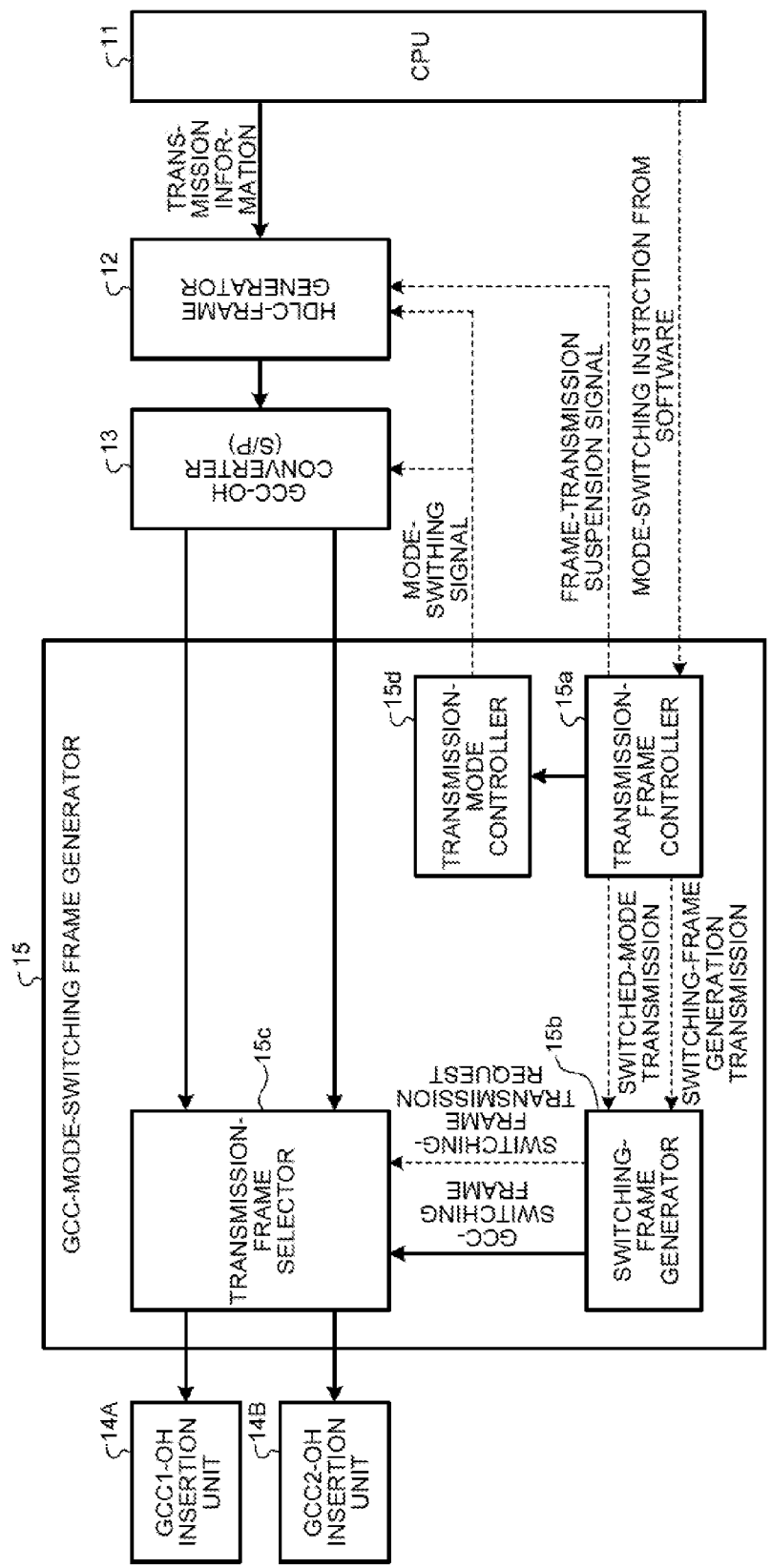
FIG. 2 is a block diagram of a detailed configuration of a GCC-mode switching frame generator.
Figure 3:
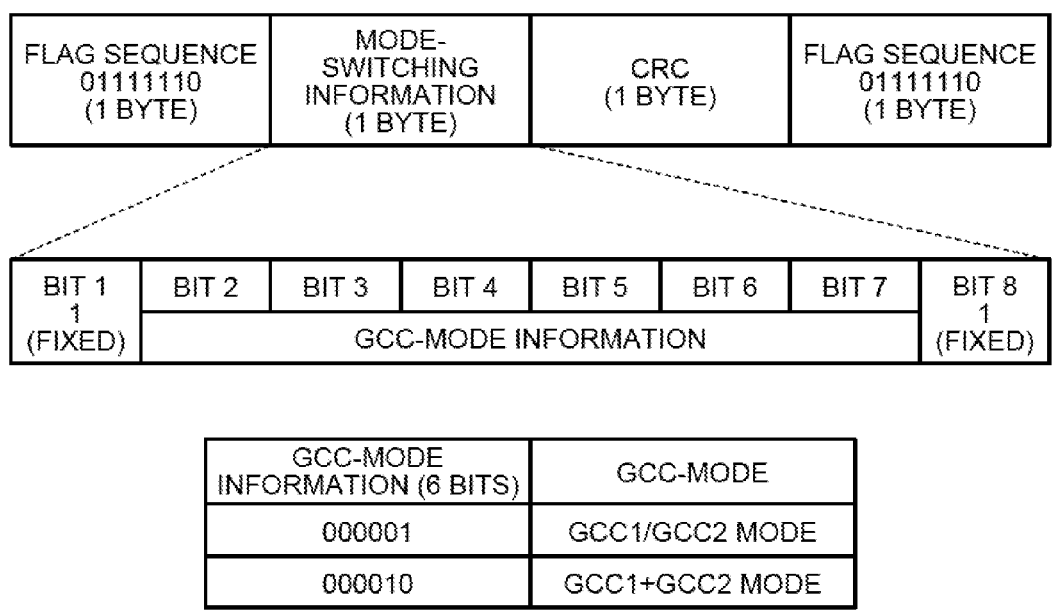
FIG. 3 is a diagram of a GCC-mode-switching special frame format.
Figure 4:
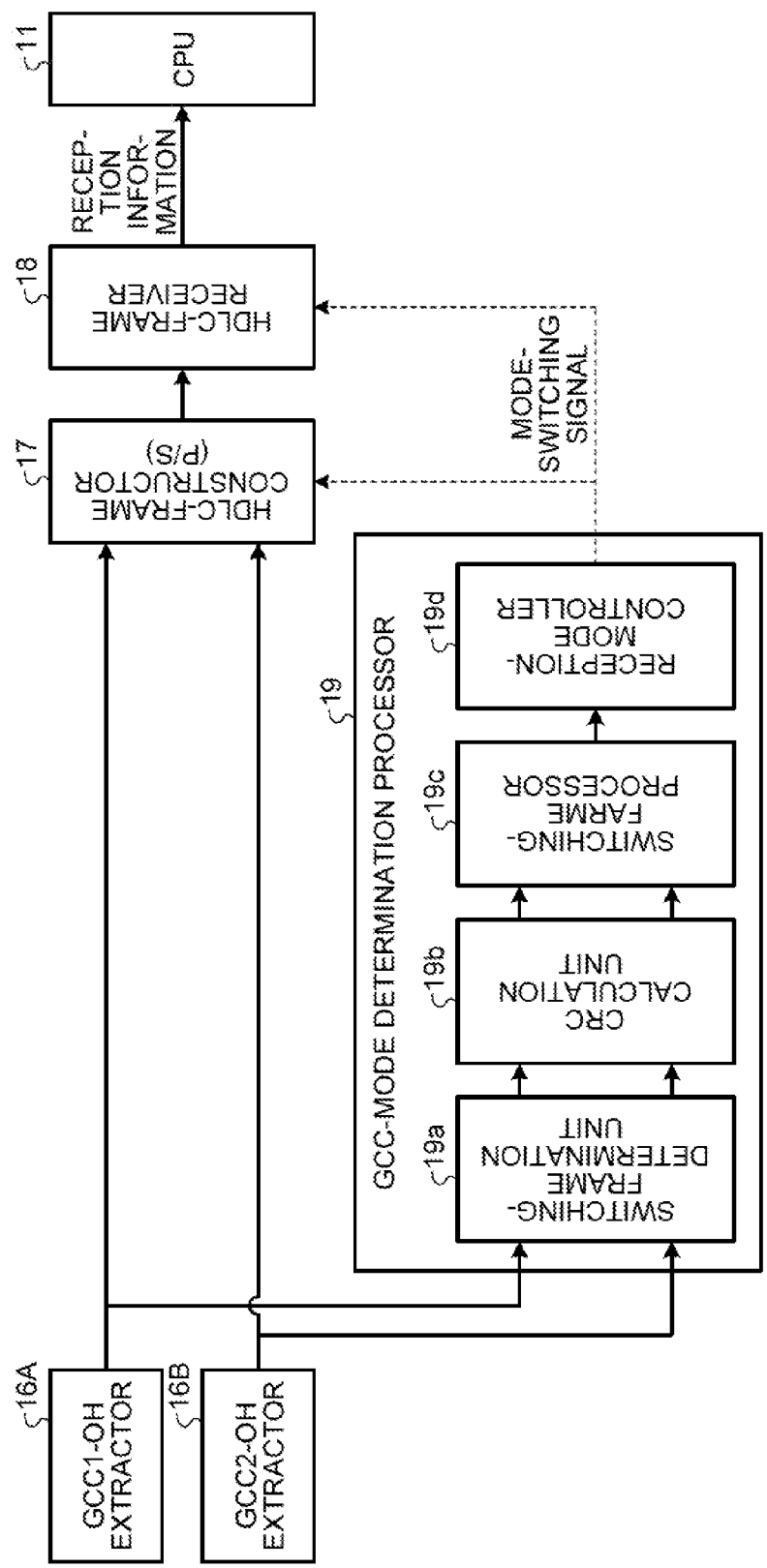
FIG. 4 is a block diagram of a detailed configuration of a GCC-mode determination processor.

To begin with, a configuration of an optical transport apparatus in accordance with the first embodiment is described with reference to FIGS. 1 to 4. FIG. 1 is a block diagram of an overall configuration of an optical transport apparatus 10 in accordance with the first embodiment. FIG. 2 is a block diagram of a detailed configuration of a GCC-mode switching frame generator. FIG. 3 is a diagram of a GCC-mode-switching special frame format. FIG. 4 is a block diagram of a detailed configuration of a GCC-mode determination processor.

As depicted in FIG. 1, the optical transport apparatus 10 includes a CPU 11, an HDLC-frame generator 12, a GCC-OH converter 13, a GCC1-OH insertion unit 14A, a GCC2-OH insertion unit 14B, a GCC-mode-switching frame generator 15, a GCC1-OH extractor 16A, a GCC2-OH extractor 16B, an HDLC-frame constructor 17, an HDLC-frame receiver 18, and a GCC-mode determination processor 19. Processes in these components are described below.

The CPU 11 includes an internal memory for storing programs and data corresponding to various procedures. Using the internal memory, the CPU 11 performs various processes. In particular, the CPU 11, using software, processes reception information encapsulated in a received HDLC frame. Furthermore, the CPU 11, using software, generates transmission information and sends the transmission information to the HDLC-frame generator 12 described later.

The HDLC-frame generator 12 encapsulates the transmission information, which is generated using software, in the HDLC frame so as to generate the HDLC serial data. In detail, depending on the mode set by the software, the HDLC-frame generator 12 generates the HDLC serial data: HDLC serial data of 1.3 Mbps×2 Channels in the GCC1/GCC2 mode, or HDLC serial data of 2.6 Mbps×1 Channel in the GCC1+GCC2 mode.

The HDLC-frame generator 12 sends the generated HDLC serial data to the GCC-OH converter 13. Furthermore, when the HDLC-frame generator 12 receives a frame transmission suspension signal from the GCC-mode-switching frame generator 15, the HDLC-frame generator 12 stops generating the HDLC frame temporarily. When the HDLC-frame generator 12 receives a release instruction of the frame transmission suspension signal from the GCC-mode-switching frame generator 15, the HDLC-frame generator 12 resumes generating the HDLC frame in accordance with the changed GCC mode.

The GCC-OH converter 13 converts the HDLC serial data into parallel data so that the data can be mapped onto the GCC1-OH or the GCC2-OH. Depending on the mode set by the software, the GCC-OH converter 13 converts the serial data into the parallel data; the GCC-OH converter 13 converts the serial data of 1.3 Mbps×2 Channels into each parallel data of 16 bits on the GCC1/GCC2 mode.

The GCC-OH converter 13 converts the serial data of 2.6 Mbps×1 Channel into the parallel data of 16 bits×2 (32 bits in total) on the GCC1+GCC2 mode. The GCC-OH converter 13 sends the converted 16-bit parallel data to the GCC1-OH insertion unit 14A and the GCC2-OH insertion unit 14B.

The GCC1-OH insertion unit 14A and the GCC2-OH insertion unit 14B map the parallel data sent from the GCC-OH converter 13 onto the positions of GCC1-OH and GCC2-OH in an OTN signal, respectively. Furthermore, when receiving the GCC-mode switching frame from a transmission-frame selector 15c described later, the GCC1-OH insertion unit 14A and the GCC2-OH insertion unit 14B map the GCC-mode switching frame in the positions of GCC1-OH or GCC2-OH in the OTN signal, respectively, and then transmit the OTN signal to the corresponding apparatus.

The GCC-mode-switching frame generator 15 generates a GCC-mode switching special frame for instructing the corresponding apparatus to switch the GCC mode. The GCC-mode-switching frame generator 15 inserts the generated GCC-mode switching special frame into the GCC overhead and then transmits the GCC-mode switching special frame to the corresponding apparatus. After transmitting the GCC-mode switching special frame, the GCC-mode-switching frame generator 15 switches the GCC mode of its own apparatus.

A configuration of the GCC-mode-switching frame generator 15 is described in detail with reference to FIG. 2. As depicted in FIG. 2, the GCC-mode-switching frame generator 15 includes a transmission-frame controller 15a, a switching-frame generator 15b, the transmission-frame selector 15c, and a transmission-mode controller 15d.

Upon receiving an instruction for switching the mode from the software, the transmission-frame controller 15a sends a frame-transmission suspension signal to the HDLC-frame generator 12. Furthermore, at the same time, the transmission-frame controller 15a sends (notifies) a switched mode (GCC1/GCC2 mode or GCC1+GCC2 mode) and a switching-frame generation instruction to the switching-frame generator 15b.

After the switching frame is transmitted by the transmission-frame selector 15c described later, the transmission-frame controller 15a sends the changed GCC mode (i.e., an instruction for changing the GCC mode) to the transmission-mode controller 15d. Furthermore, the transmission-frame controller 15a releases the instruction of the frame-transmission suspension signal that has been sent to the HDLC-frame generator 12. The HDLC-frame generator 12 having received the releasing instruction of the frame-transmission suspension signal resumes generating the HDLC frame according to the changed GCC mode.

Upon receiving the instruction for switching the mode or the instruction for generating the switching frame, the switching-frame generator 15b generates the GCC-mode switching special frame (described later in detail with reference to FIG. 3). Furthermore, at the same time with the generation of the GCC-mode switching frame, the switching-frame generator 15b sends a switching-frame transmission request to the transmission-frame selector 15c.

The GCC-mode switching special frame format is described with reference to FIG. 3. As depicted in FIG. 3, the GCC-mode switching frame is an HDLC frame of four bytes in total, including a one-byte mode-switching-information byte and a one-byte CRC (Cyclic Redundancy Check) that are sandwiched by flag sequences defined by the HDLC standard. Bit 1 and Bit 8 in the one-byte mode-switching information byte are fixed as "1".

Therefore, the mode switching information is not the same as the fixed pattern "01111110" of the flag sequence. The other six bits, Bits 2 to 7, are used for transmission of the GCC-mode information. When the GCC-mode information is "000001", the switched GCC mode is the GCC1/GCC2 mode. When the GCC-mode information is "000010", the switched GCC mode is GCC1+GCC2 mode. A CRC is a common method for detecting errors in data transfer.

Refer to FIG. 2 again. Receiving a switching-frame transmission request, the transmission-frame selector 15c transmits the generated GCC-mode-switching frame to both the GCC1-OH insertion unit 14A and the GCC2-OH insertion unit 14B. Thus, the GCC-mode-switching frame in the GCC1-OH and GCC2-OH in the OTN signal is transmitted to the corresponding apparatus.

Upon receiving an instruction for changing the GCC mode, the transmission-mode controller 15d sends a mode-switching signal to the GCC-OH converter 13 and the HDLC-frame generator 12 so as to switch the GCC mode.

Refer to FIG. 1 again. The GCC1-OH extractor 16A and the GCC2-OH extractor 16B extract the 16-bit GCC1-OH and 16-bit GCC2-OH from OH in the input OTN signal, respectively. The GCC1-OH extractor 16A and the GCC2-OH extractor 16B send these extracted 16-bit GCC1-OH parallel data and 16-bit GCC2-OH parallel data to the HDLC-frame constructor 17.

The HDLC-frame constructor 17 converts the 16-bit GCC-OH parallel data into an HDLC frame. Depending on the mode set by the software, the HDLC-frame constructor 17 converts the parallel data into the HDLC frame: an HDLC frame of 1.3 Mbps×2 Channels in the GCC1/GCC2 mode, or an HDLC frame of 2.6 Mbps×1 Channel in the GCC1+GCC2 mode. The HDLC-frame constructor 17 sends the converted HDLC frame to the HDLC-frame receiver 18.

The HDLC-frame receiver 18 performs termination processes for the HDLC frame. Depending on the mode set by the software, the HDLC-frame receiver 18 performs the following termination processes: a termination process on 1.3 Mbps×2 Channels in the GCC1/GCC2 mode, and a termination process on 2.6 Mbps×1 Channel in the GCC1+GCC2 mode. Then, the CPU 11 processes reception information encapsulated in the HDLC frame using software.

The GCC-mode determination processor 19 determines, when the GCC overhead is received from the corresponding apparatus, whether the GCC-mode-switching special frame is inserted in the GCC overhead. When the GCC-mode determination processor 19 determines that the GCC-modeswitching special frame is inserted in the GCC overhead, the GCC-mode determination processor 19 switches the GCC mode of its own apparatus A configuration of the GCC-mode determination processor 19 is described in detail with reference to FIG. 4. As depicted in FIG. 4, the GCC-mode determination processor 19 includes a switching-frame determination unit 19a, a CRC calculation unit 19b, a switching-frame processor 19c, and a reception-mode controller 19d.

The switching-frame determination unit 19a maintains the GCC-OH of two frames, i.e. four bytes in total, extracted by the GCC1-OH extractor 16A and the GCC2-OH extractor 16B. When the first and last bytes of the maintained four-byte GCC-OH are the pattern of flag sequences and the middle two bytes are not the flag sequences, the switching-frame determination unit 19a determines that the GCC-OH is a GCC-switching frame.

Frames whose size excluding flag sequences is smaller than four bytes are invalid frames in the HDLC standard. There is usually no four-byte frame sandwiched by the flag sequences. Therefore, the frames are discarded by the HDLC-frame constructor as invalid frames and do not affect communication between the corresponding apparatuses in normal operations. The frames are isolated between the transmitting-side GCC-mode-switching frame generator 15 and the receiving-side GCC-mode determination processor 19 of the corresponding apparatuses. Due to such a feature, the middle two bytes of the GCC switching frame that has been checked by the switching-frame determination unit 19a are sent to the CRC calculation unit 19b.

The CRC calculation unit 19b performs a CRC calculation on the two-byte switching frame. When an error is found during the check, the CRC calculation unit 19b discards the two-byte data. Furthermore, when no error is found during the check, the CRC calculation unit 19b sends one-byte mode-switching information to the switching-frame processor 19c.

The switching-frame processor 19c extracts mode information in the middle six bits. When the mode information is the "000001" pattern both in GCC1 and GCC2, the switching-frame processor 19c determines that the GCC mode is the GCC1/GCC2 mode. When the mode information is the "000010" pattern, the switching-frame processor 19c determines that the GCC mode is GCC1+GCC2 mode. Then, the determination result is sent to the reception-mode controller 19d. When the pattern is not defined or when the patterns of GCC1 and GCC2 are inconsistent, the switching-frame processor 19c discards the determination result.

According to the determination result of the GCC mode, the reception-mode controller 19d generates a mode-switching signal for the HDLC-frame constructor 17 and the HDLC-frame receiver 18 so that the GCC mode is switched.

Processes in Optical Transport Apparatus

Figure 5:
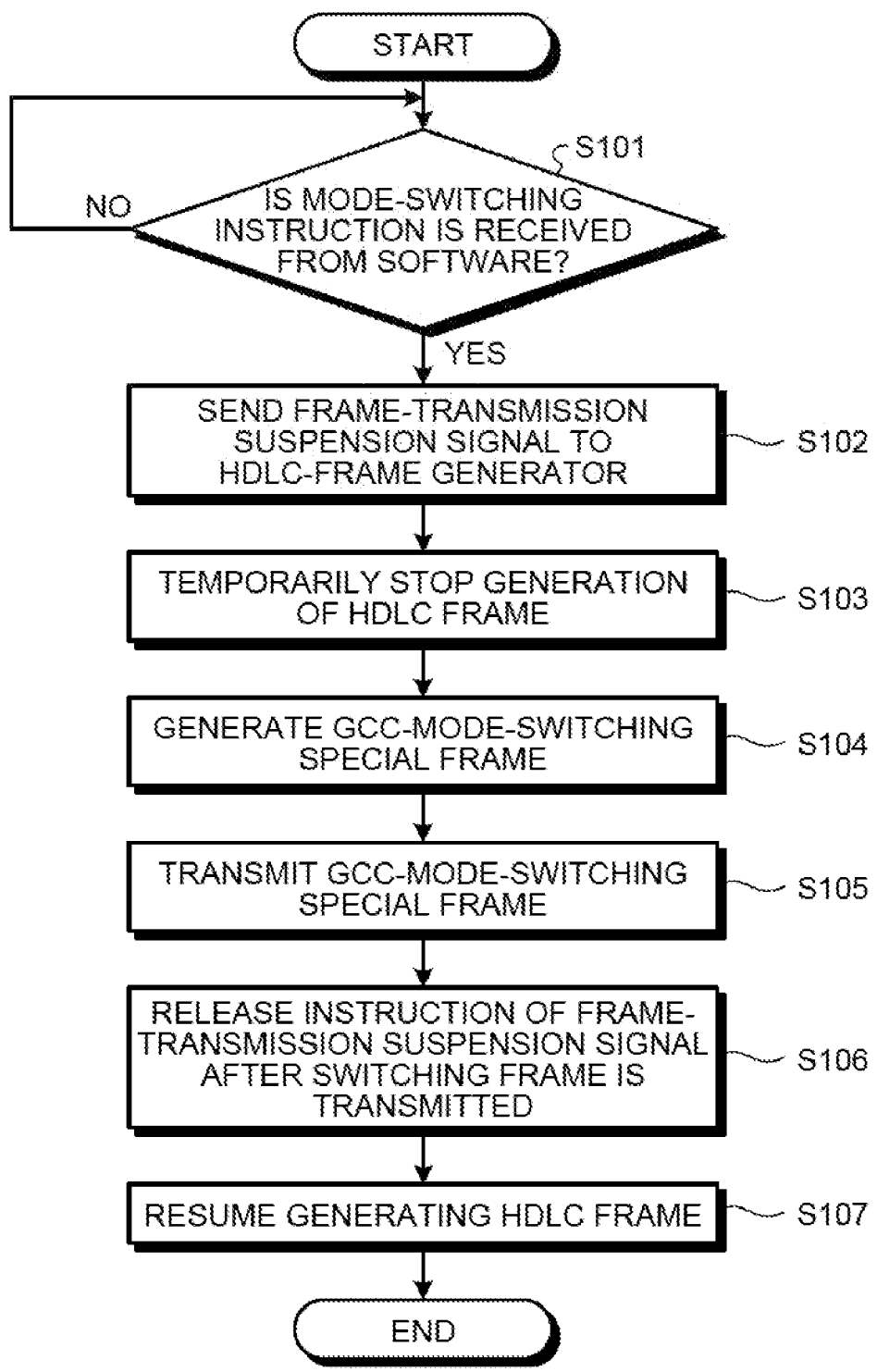
FIG. 5 is a flowchart of a GCC-switching frame generation process of the optical transport apparatus in accordance with the first embodiment.
Figure 6:
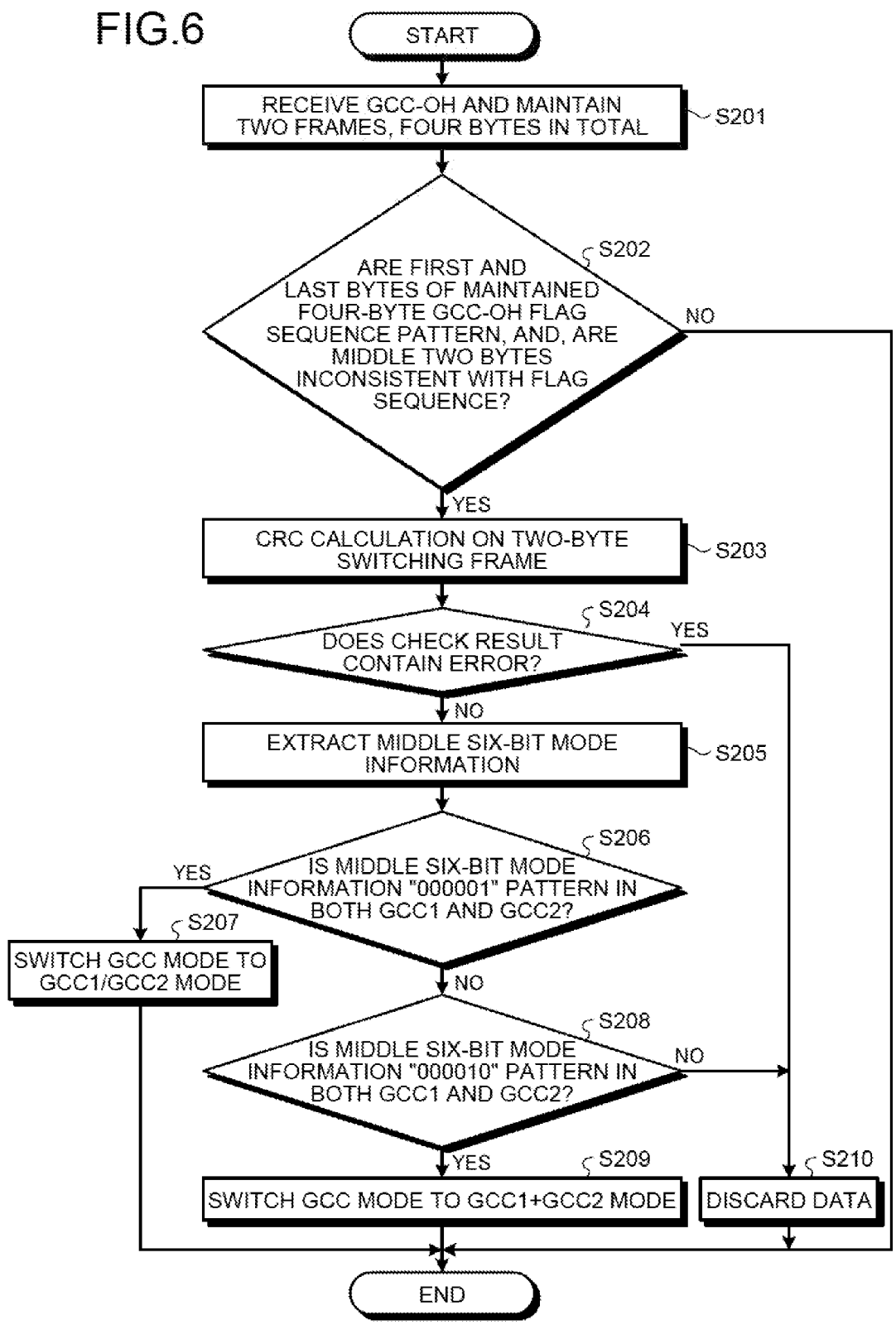
FIG. 6 is a flowchart of a GCC-mode determination process of the optical transport apparatus in accordance with the first embodiment.

A process in the optical transport apparatus 10 in accordance with the first embodiment is described with reference to FIGS. 5 and 6. FIG. 5 is a flowchart of a GCC-switching frame generation process of the optical transport apparatus 10 in accordance with the first embodiment. FIG. 6 is a flowchart of a GCC-mode determination process of the optical transport apparatus 10 in accordance with the first embodiment.

As depicted in FIG. 5, when a mode-switching instruction from software is received (Step S101: Yes), the GCC-mode-switching frame generator 15 in the optical transport apparatus 10 sends a frame-transmission suspension signal to the HDLC-frame generator 12 (Step S102). When a frame transmission suspension signal is received, the HDLC-frame generator 12 stops generating the HDLC frame temporarily (Step S103).

The GCC-mode-switching frame generator 15 generates a GCC-mode-switching special frame (Step S104). Then, the GCC-mode-switching frame generator 15 maps the GCC-mode-switching frame onto the positions of GCC1-OH and GCC2-OH in the OTN signal and transmits the OTN signal to the corresponding apparatus (Step S105).

After the switching frame is transmitted, the GCC-mode-switching frame generator 15 releases an instruction of the frame-transmission suspension signal that has been sent to the HDLC-frame generator 12 (Step S106). Upon receiving the releasing instruction for the frame-transmission suspension signal, the HDLC-frame generator 12 resumes generating the HDLC frame according to the changed GCC mode (Step S107).

A GCC-mode determination process in the optical transport apparatus 10 in accordance with the first embodiment is described with reference to FIG. 6. As depicted in FIG. 6, the GCC-mode determination processor 19 in the optical transport apparatus 10 receives and maintains GCC-OH of two frames, i.e. four bytes (Step S201). The GCC-mode determination processor 19 determines whether the first and last bytes in the maintained four bytes of GCC-OH are flag sequence patterns and whether the middle two bytes are not flag sequences (Step S202).

When it is determined as a result that the first and last bytes of the maintained four-byte GCC-OH are not flag sequence patterns or that the middle two bytes are flag sequences (Step S202: No), the GCC-mode determination processor 19 determines that the frame is not a GCC-switching frame and terminates the process.

When it is determined as a result that the first and last bytes of the maintained four-byte GCC-OH are flag sequence patterns and that the middle two bytes are not flag sequences (Step S202: Yes), the GCC-mode determination processor 19 performs a CRC calculation on the switching frame of the middle two bytes as the GCC switching frame (Step S203) and determines whether there is an error in the check (Step S204).

When there is an error as a result of the check (Step S204: Yes), the GCC-mode determination processor 19 discards the two-byte data (Step S210). Furthermore, when there is no error as a result of the check (Step S204: No), the GCC-mode determination processor 19 extracts the middle six-bit mode information (Step S205).

The GCC-mode determination processor 19 determines whether the extracted middle six-bit mode information is a "000001" pattern in both GCC1 and GCC2 (Step S206). When it is determined as a result that the mode information is "000001" in both GCC1 and GCC2 (Step S206: Yes), the GCC-mode determination processor 19 determines that the GCC mode is the GCC1/GCC2 mode and switches the GCC mode to the GCC1/GCC2 mode (Step S207).

Furthermore, when GCC1 and GCC2 are not "000001" patterns (Step S206: No), the GCC-mode determination processor 19 determines whether the mode information is a "000010" pattern in both GCC1 and GCC2 (Step S208). When it is determined as a result that GCC1 and GCC2 are "000010" patterns (Step S208: Yes), the GCC-mode determination processor 19 determines that the mode is GCC1+GCC2 mode and switches the GCC mode to the GCC1+GCC2 mode (Step S209).

Furthermore, when GCC1 and GCC2 are not "000010" patterns (or not a defined pattern or inconsistent with each other) (Step S208: No), the GCC-mode determination processor 19 discards the data (Step S210).

Effect of First Embodiment

As described above, the optical transport apparatus 10 generates the GCC-mode-switching special frame for instructing the corresponding apparatus to change the GCC mode, inserts the generated GCC-mode-switching special frame into the GCC overhead, and then transmits the GCC overhead to the corresponding apparatus. After the transmission of the GCC-mode-switching special frame, the optical transport apparatus 10 switches the GCC mode of its own apparatus. Furthermore, when the GCC overhead is received from the corresponding apparatus, the optical transport apparatus 10 determines whether the GCC-mode-switching special frame is inserted into the GCC overhead. When it is determined that the GCC-mode-switching special frame is inserted in the GCC overhead, the optical transport apparatus 10 switches the GCC mode of it own apparatus. Because the special HDLC frame, which is generated by hardware for switching the GCC mode, is transmitted using GCC-OH between the corresponding apparatuses and the GCC mode between the corresponding apparatuses can be automatically switched by hardware, it is not required for each apparatus to switch the GCC mode. The GCC mode between apparatuses located far away can be readily switched by a monitoring control apparatus. As a result, the GCC mode switching on the OTN network can be performed efficiently at a low cost.

Furthermore, when the GCC-mode-switching special frame is generated in the first embodiment, the transmission of transmission frames between apparatuses is suspended. When the GCC-mode-switching special frame is transmitted to the corresponding apparatus, the transmission of transmission frames between apparatuses is resumed. Therefore, when the GCC-mode switching request is received from software, the GCC-mode switching-frame generator 15b temporarily suspends transmission of transmission frames between apparatuses and transmits the GCC-mode-switching special frame to the corresponding apparatus. Then, the transmission frames between apparatuses according to the changed GCC mode are transmitted again. As a result, the corresponding apparatus can switch the GCC mode according to a result of the determination based on the GCC-mode switching frame. Furthermore, although the mode switching causes the mode to be temporarily inconsistent, the GCC mode can be switched without a lack of transmission frames between apparatuses.

Furthermore, in the first embodiment, the four-byte GCC overhead received from the corresponding apparatus is maintained. It is determined whether the four-byte GCC overhead is a four-byte frame sandwiched by flag sequences. When the four-byte data is a four-byte frame sandwiched by flag sequences, the GCC mode of its own apparatus is switched. Therefore, the GCC-mode-switching special frame constituting a four-byte HDLC frame enables a hardware-based automatic switching that does not affect processes for the frame transmission between apparatuses.

[b] Second Embodiment

In the above-mentioned first embodiment, the GCC-mode-switching special frame as depicted in FIG. 3 is transmitted between corresponding apparatuses to switch the GCC mode of the corresponding apparatuses. However, the present embodiment is not limited to this. As depicted in FIG. 7, an extended GCC-mode-switching special HDLC frame for switching the GCC mode may be transmitted between corresponding apparatuses to switch the GCC mode of the corresponding apparatuses.

Figure 8:
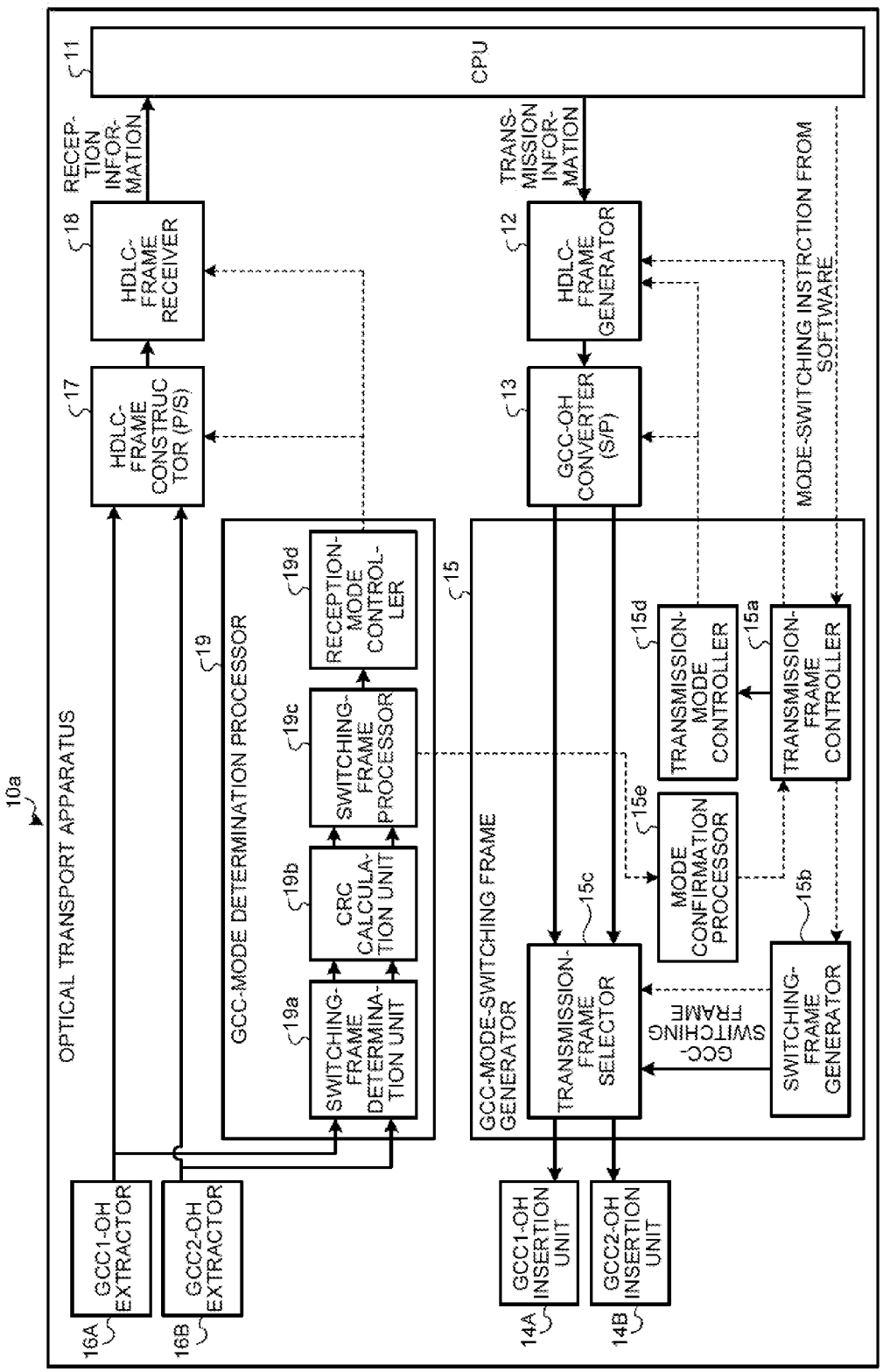
FIG. 8 is a block diagram of an overall configuration of an optical transport apparatus in accordance with a second embodiment.

In the second embodiment below, the extended GCC-mode-switching special HDLC frame is transmitted between corresponding apparatuses to switch the GCC mode of the corresponding apparatuses. A configuration and processes of an optical transport apparatus 10a in accordance with the second embodiment are described with reference to FIG. 7 and FIG. 8. FIG. 7 is a diagram illustrating an extended GCC-mode-switching special format. FIG. 8 is a block diagram of an overall configuration of the optical transport apparatus 10a in accordance with the second embodiment.

FIG. 7 illustrates a frame that is extended from the GCC-mode-switching special frame and used by the optical transport apparatus 10a in accordance with the second embodiment. As depicted in FIG. 7, the extended GCC-mode-switching special HDLC frame includes a frame-type information in Bit2 to Bit3 and GCC-mode information in Bit4 to Bit7 of the mode-switching information.

The frame-type information "00" indicates a first command frame that is transmitted from a transmitting unit of its own apparatus to a receiving unit of the corresponding apparatus. The information "01" indicates a first response frame that is a reply from a transmitting unit of the corresponding apparatus to a receiving unit of its own apparatus.

Furthermore, "10" indicates a second command frame, and "11" indicates a second response frame. The GCC-mode information "0001" indicates the GCC1/GCC2 mode, and "0010" indicates the GCC1+GCC2 mode. The use of such frames can prevent an inconsistency problem in the GCC mode, which can be otherwise caused by connection errors between the corresponding apparatuses.

A configuration of the optical transport apparatus 10a in accordance with the second embodiment is described below with reference to FIG. 8. As depicted in FIG. 8, the optical transport apparatus 10a in accordance with the second embodiment includes a mode confirmation processor 15e in the GCC-mode-switching frame generator 15. That is a different configuration from that of the optical transport apparatus 10 in accordance with the first embodiment depicted in FIG. 1.

When receiving a mode-switching instruction from software, the transmission-frame controller 15a performs a first transmission of a switching-frame generation to the switching-frame generator 15b. The switching-frame generator 15b sets "00" (command-one) as a frame type, and then sets "0001" when the switched GCC mode is the GCC1/GCC2 mode or sets "0010" when the switched GCC mode is the GCC1+GCC2 mode as the GCC mode information. Then, the switching-frame generator 15b transmits the information to the corresponding apparatus.

At this moment, the optical transport apparatus 10a (hereinafter, "command generation apparatus") does not switch the GCC mode of the GCC-OH converter 13 and the HDLC-frame generator 12. The switching-frame processor 19c in the corresponding apparatus receiving a command-one frame sends a transmission request of the received GCC-mode information and the response-one frame to the mode confirmation processor 15e.

At this moment, the GCC modes of the HDLC-frame constructor 17 and the HDLC-frame receiver 18 in a receiving unit are not switched. The mode confirmation processor 15e in the corresponding apparatus sends a transmission request of the received GCC-mode information and a response-one frame to the switching-frame generator 15b via the transmission-frame controller 15a.

The switching-frame generator 15b in the corresponding apparatus sets "01" (response-one) as a frame type, sets the received GCC-mode information as the GCC-mode information, and then transmits the information back to the command generation apparatus 10a.

When the command generation apparatus 10a receives a response-one frame, the switching-frame processor 19c transmits a command-two transmission request and the received GCC-mode information to the mode confirmation processor 15e.

Then, the mode confirmation processor 15e determines that the GCC-switching command has reached the corresponding apparatus and sets "10" (command-two) as a frame type and sets the received GCC-mode information as the GCC-mode information, and transmits a command frame back to the corresponding apparatus. Furthermore, the mode confirmation processor 15e performs a GCC-mode switching of the transmitting unit (GCC-OH converter 13 and the HDLC-frame generator 12).

The switching-frame processor 19c in the corresponding apparatus receiving the command-two frame sends the received GCC-mode information and a response-two frame transmission request to the mode confirmation processor 15e, and performs a GCC-mode switching of the receiving unit (the HDLC-frame constructor 17 and the HDLC-frame receiver 18).

The corresponding apparatus sets "11" (response-two) as a frame type and sets the received GCC-mode information as the GCC-mode information and sends the information back to the command generation apparatus 10a again. Furthermore, the corresponding apparatus performs a GCC-mode switching of the GCC-OH converter 13 and the HDLC-frame generator 12.

Upon receiving the response-two frame, the command generation apparatus 10a performs a GCC-mode switching of the HDLC-frame constructor and the HDLC frame receiver 18. Thus the GCC-mode switching in the transmission and reception between the corresponding apparatuses is completed.

In the second embodiment described above, the command generation apparatus 10a generates the GCC-mode-switching special frame that includes the frame-type information, which indicates one of the following frames: a first command frame instructing the corresponding apparatus to switch the GCC mode, a first response frame indicating that the first command frame is received, a second command frame instructing the corresponding apparatus to switch the GCC mode after the reception of the first response frame, or a second response frame indicating that the second command frame is received. When the GCC-mode-switching special frame including the second command frame is received or when the GCC-mode-switching special frame including the second response frame is received, the command generation apparatus 10a switches the GCC mode of the receiving unit of its own apparatus. Furthermore, when the GCC-mode-switching special frame including the second command frame is to be transmitted to the corresponding apparatus or when the GCC-mode-switching special frame including the second response frame is to be transmitted to the corresponding apparatus, the command generation apparatus 10a switches the GCC mode of the transmitting unit of its own apparatus.

As described above, the GCC-mode-switching special format includes the frame-type information, and the mode confirmation processor 15e identifies the type of the command or response frames. The GCC-mode switching can be performed after the confirmation that a command has reached the corresponding apparatus. An incorrect mode switching, which may be caused by signal errors or the like between the apparatuses, can be prevented. The transmission/reception simultaneous switching between the corresponding apparatuses can be performed, whereby the GCC mode can be switched efficiently.

[c] Third Embodiment

Although the embodiments of the present inventions are described above, the present invention may be applied in various embodiments other than those described above. The other embodiments of the present invention are described below as a third embodiment.

System Configuration and Others

Furthermore, the components of the depicted apparatuses are merely functional concepts and are not necessarily the same as those depicted in physical terms. Specific embodiments of division or integration of each apparatus are not limited to those depicted. Depending on the various types of load or operation statues, all or some of apparatuses may be divided or integrated functionally or physically in an arbitrary manner. For example, the transmission-frame controller 15a and the switching-frame generator 15b may be integrated. Furthermore, all or some of each processing function in each apparatus may be realized as a CPU and programs that can be analyzed and executed by the CPU, or may be realized by hardware based on a wired logic.

Furthermore, of the processes described in the present embodiment, all or some of automatic processes may be performed manually while all or some of manual processes may be performed automatically employing a conventional method. Furthermore, procedures, control procedures, specific names, and information including various types of data and parameters in the above descriptions or diagrams may be arbitrarily modified except as otherwise provided.

(2) Program

Figure 9:
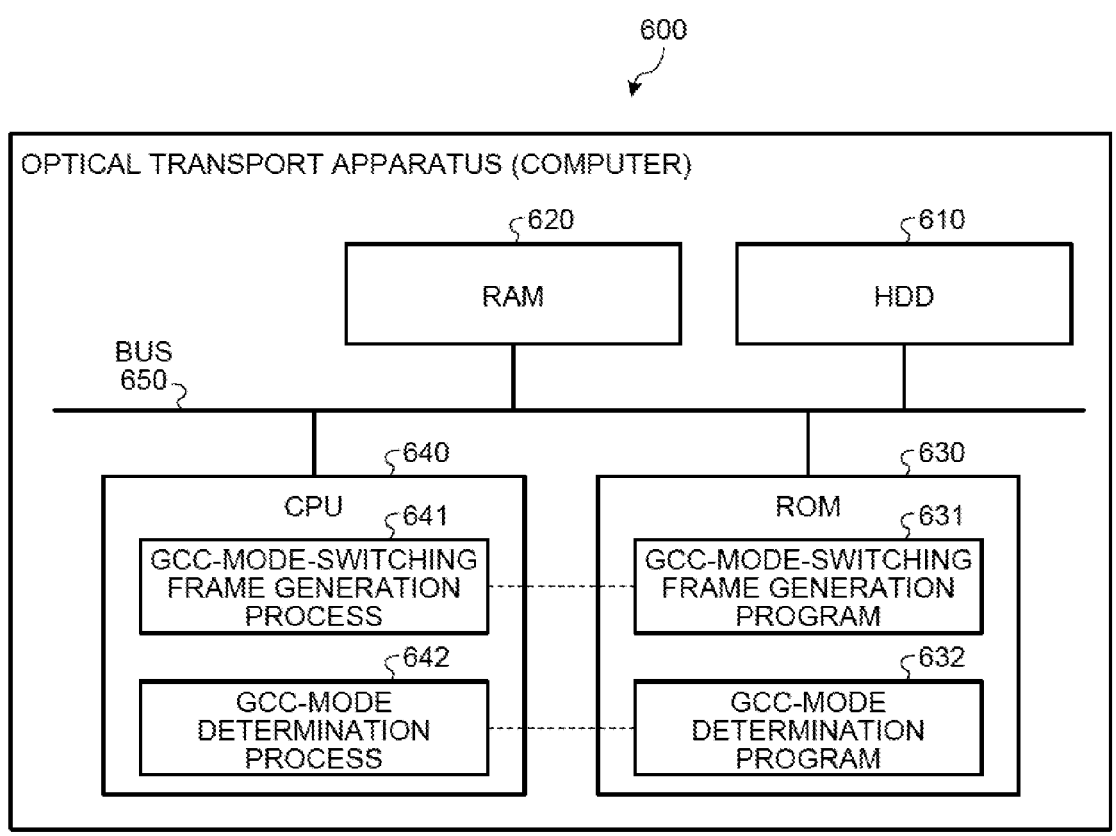
FIG. 9 is a diagram illustrating a computer for performing an optical transport program.
Figure 10:
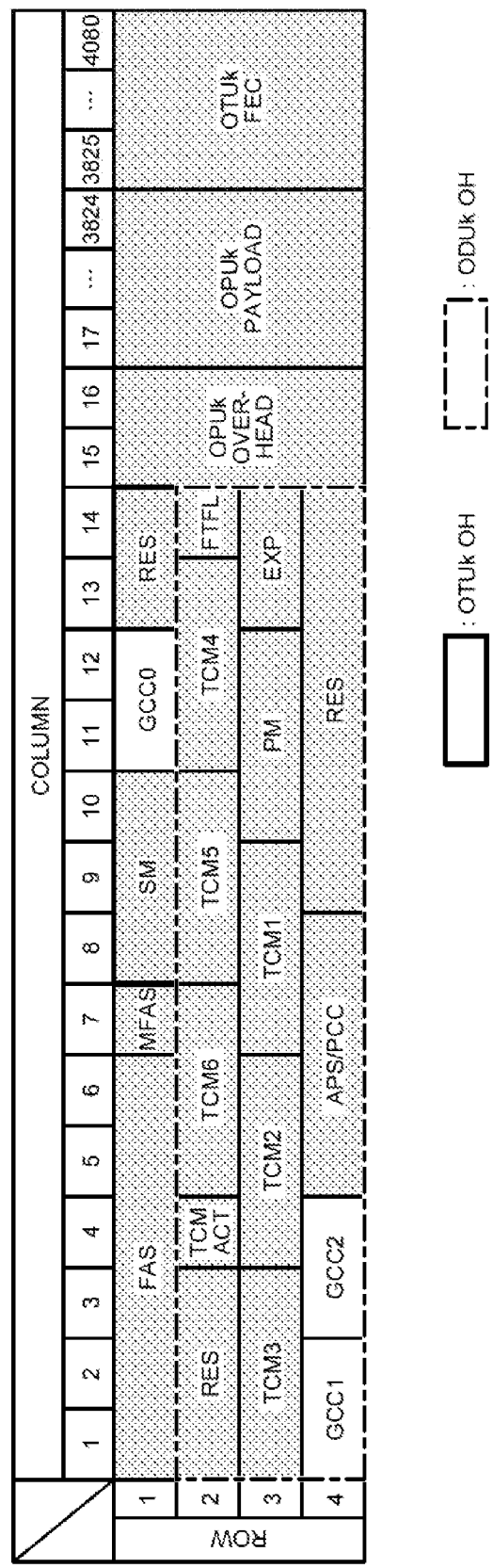
FIGS. 10 to 12 are diagrams illustrating a conventional technology.
Figure 11:
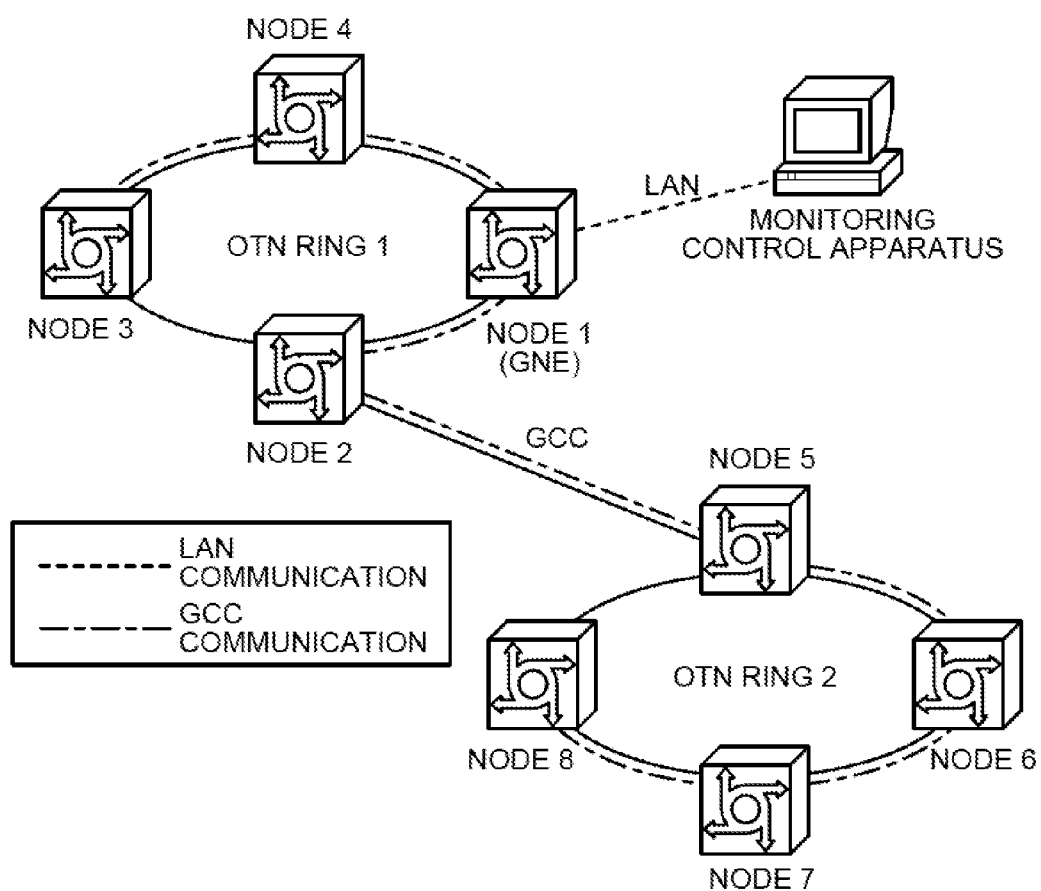
Figure 12:
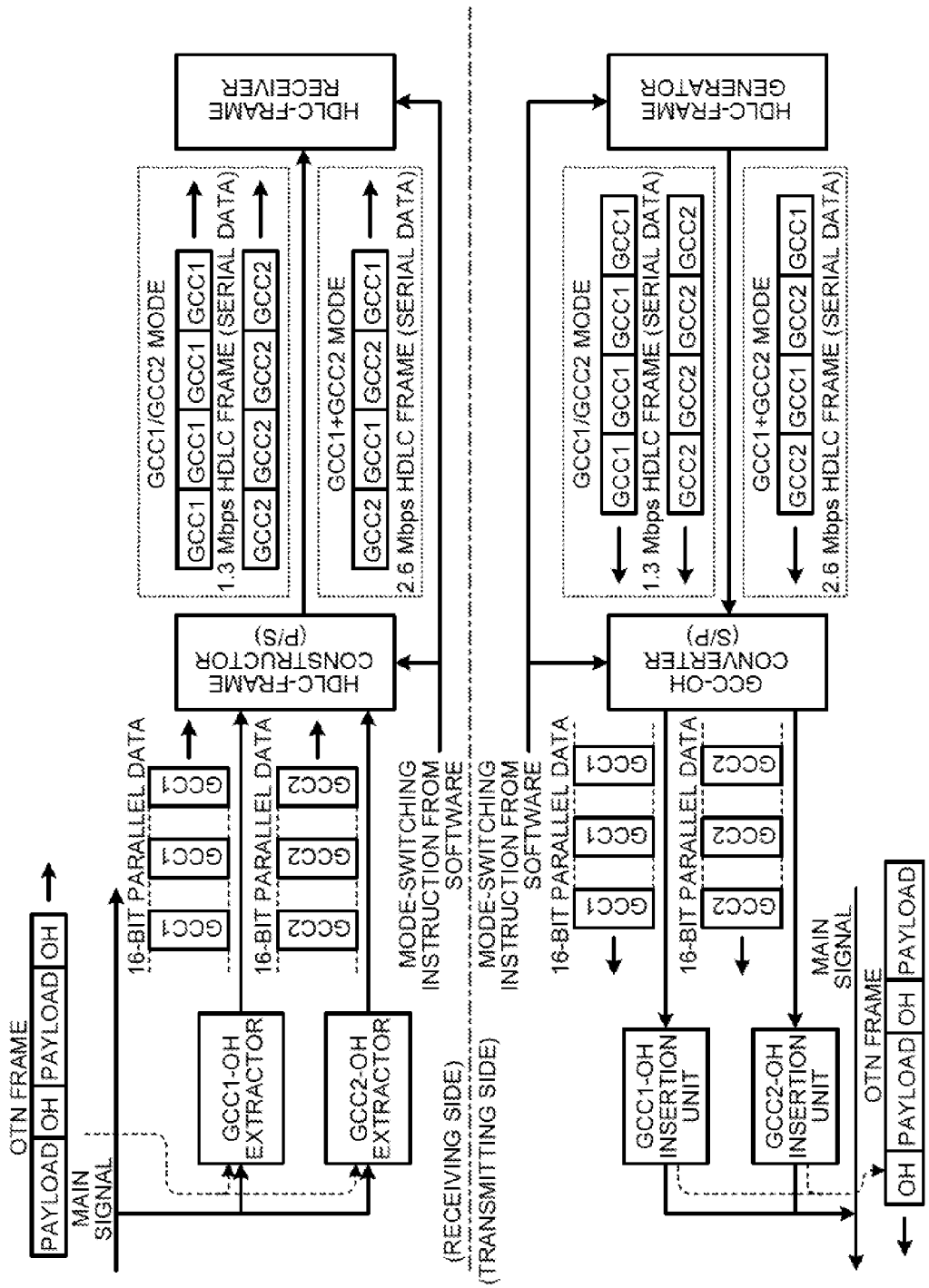

Various types of processes in the embodiments described above may be realized by computers executing prepared programs. With reference to FIG. 9, an example of a computer that executes programs representing the same functions as those in the above embodiments is described below. FIG. 9 is a diagram illustrating a computer that executes an optical transport program.

As depicted in FIG. 9, an HDD 610, a RAM 620, a ROM 630, and a CPU 640 are connected with a computer 600, i.e., an optical transport apparatus, via a bus 650.

An optical transport program representing the same functions as those in the above embodiments, i.e., a GCC-mode-switching frame generation program 631 and a GCC-mode determination processing program 632 are previously stored in the ROM 630 as depicted in FIG. 9. The programs 631 and 632 may be arbitrarily integrated or divided similarly to the components of the optical transport apparatus 10 depicted in FIG. 1.

The CPU 640 reads and executes the programs 631 and 632 from the ROM 630. As depicted in FIG. 9, the programs 631 and 632 thus function as a GCC-mode-switching frame generation process 641 and a GCC-mode determination process 642. The processes 641 and 642 correspond to the GCC-mode-switching frame generator 15 and the GCC-mode determination processor 19 depicted in FIG. 9.

The CPU 640 registers various types of data, reads out the various types of data, stores the data in the RAM 620, and executes processes according to the data stored in the RAM 620.

According to an embodiment of the present invention, a GCC-mode switching on the OTN network can be performed efficiently at a low cost.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transport apparatus, comprising:
a switching frame generator that generates a General-Communication-Channels (GCC)-mode-switching special frame for instructing a corresponding apparatus to switch a GCC mode, the switched GCC mode being applied to a data frame received after the GCC-mode-switching special frame is received;
a GCC overhead insertion unit that inserts the GCC-mode-switching special frame generated by the switching frame generator into a GCC overhead and transmits the GCC overhead to the corresponding apparatus;
a transmission-mode controller that performs a control operation to switch the GCC mode of its own apparatus after the transmission of the GCC-mode-switching special frame is completed by the GCC overhead insertion unit, the switched GCC mode being applied to a data frame sent after the GCC-mode-switching special frame is sent;
a switching-frame determination unit that determines, upon receiving the GCC overhead from the corresponding apparatus, whether the GCC-mode-switching special frame is inserted into the GCC overhead; and
a reception-mode controller that performs a control operation to switch the GCC mode of its own apparatus when the switching-frame determination unit determines that the GCC-mode-switching special frame is inserted into the GCC overhead, the changed GCC mode being applied to a data frame received after the GCC overhead is received.

2. The transport apparatus according to claim 1, further comprising
a transmission-frame controller that performs a control operation to suspend transmission of transmission frames between apparatuses when the switching frame generator generates the GCC-mode switching special frame, and that resumes transmitting the transmission frames between apparatuses when the GCC-mode-switching special frame is transmitted to the corresponding apparatus by the GCC overhead insertion unit.

3. The transport apparatus according to claim 1, wherein:
the switching-frame determination unit maintains four bytes of the GCC overhead received from the corresponding apparatus and determines whether the four-byte GCC overhead is a four-byte frame sandwiched by flag sequences; and
the reception-mode controller performs a control operation to switch the GCC mode of its own apparatus when the switching-frame determination unit determines that the four-byte data is a four-byte frame sandwiched by flag sequences.

4. The transport apparatus according to claim 1, wherein
the switching-frame generator generates a GCC-mode-switching special frame that includes a frame-type information indicating one of a first command frame instructing a corresponding apparatus to switch the GCC mode for the first time, a first response frame indicating that the first command frame is received, a second command frame instructing the corresponding apparatus to switch the GCC mode after the first response frame is received, and a second response frame indicating that the first command frame is received, and wherein the reception-mode controller performs, upon receiving the GCC-mode-switching special frame including the second command frame or receiving the GCC-mode-switching special frame including the second response frame, a control operation to switch the GCC mode of a receiving unit of its own apparatus, and
the transport apparatus further includes a mode confirmation processor that performs, upon receiving the GCC-mode-switching special frame including the first response frame from the corresponding apparatus or transmitting the GCC-mode-switching special frame including the second response frame to the corresponding apparatus, a control operation to switch the GCC mode of its own apparatus.

5. A transport method, comprising:
generating a General-Communication-Channels (GCC)-mode-switching special frame for instructing a corresponding apparatus to switch a GCC mode, the switched GCC mode being applied to a data frame received after the GCC-mode-switching special frame is received;
inserting the GCC-mode-switching special frame generated in the generating into a GCC overhead and transmitting the GCC overhead to the corresponding apparatus;
performing a control operation to switch the GCC mode of its own apparatus after transmission of the GCC-mode-switching special frame is completed in the inserting, the switched GCC mode being applied to a data frame sent after the GCC-mode-switching special frame is sent;
determining, upon receiving the GCC overhead from the corresponding apparatus, whether the GCC-mode-switching special frame is inserted into the GCC overhead; and
performing a control operation to switch the GCC mode of its own apparatus when it is determined that the GCC-mode-switching special frame is inserted into the GCC overhead in the determining, the changed GCC mode beinq applied to a data frame received after the GCC overhead is received.

6. A non-transitory computer readable storage medium having stored therein a transport program, the transport program causing a computer to execute a process comprising:
generating a General-Communication-Channels (GCC-mode-switching special frame for instructing a corresponding apparatus to switch a GCC mode, the switched GCC mode being applied to a data frame received after the GCC-mode-switching special frame is received;
inserting the GCC-mode-switching special frame generated in the generating into a GCC overhead and transmitting the GCC overhead to the corresponding apparatus;
performing a control operation to switch the GCC mode of its own apparatus after transmission of the GCC-mode-switching special frame is completed in the inserting, the switched GCC mode being applied to a data frame sent after the GCC-mode-switching special frame is sent;
determining, upon receiving the GCC overhead from the corresponding apparatus, whether the GCC-mode-switching special frame is inserted into the GCC overhead; and
performing a control operation to switch the GCC mode of its own apparatus when it is determined that the GCC-mode-switching special frame is inserted into the GCC overhead in the determining, the changed GCC mode being applied to a data frame received after the GCC overhead is received.

* * * * *